United States Patent [19]

Lantz

[11] 4,061,404
[45] Dec. 6, 1977

[54] BRAKE PRESSURE CONTROL VALVE
[75] Inventor: Charles Hunter Lantz, Troy, Ohio
[73] Assignee: The B. F. Goodrich Company, Akron, Ohio
[21] Appl. No.: 747,680
[22] Filed: Dec. 6, 1976
[51] Int. Cl.² .............................................. B60T 8/06
[52] U.S. Cl. .................................................... 303/118
[58] Field of Search ............ 188/181 A; 303/40, 115, 303/117–119

[56] References Cited
U.S. PATENT DOCUMENTS
3,902,764 9/1975 Sebo ...................................... 303/118

Primary Examiner—Duane A. Reger
Attorney, Agent, or Firm—Harry F. Pepper, Jr.; W. A. Shira, Jr.

[57] ABSTRACT

A valve for regulating the braking pressure applied to a wheel has a braking fluid inlet and a braking fluid outlet. A fluid passageway through the valve provides communication between the inlet and outlet. A first piston assembly is adapted to close the passageway upon the occurrence of a skid or an impending skid situation at the wheel. The first piston is also adapted to reopen the passageway upon removal of the skid or impending skid situation. A second piston assembly is adapted to partially restrict passage of fluid through the passageway upon the reopening of the passageway by the first piston assembly after the skid or an impending skid situation.

4 Claims, 3 Drawing Figures

BRAKE PRESSURE CONTROL VALVE

BACKGROUND

This invention relates to skid control systems and more particularly to braking pressure control valves for use in these systems.

To stop a moving vehicle in the shortest possible distance, the braking pressure applied to the brakes of the vehicle must be maintained at an optimum level. This optimum level of braking pressure will vary according to several factors, including the coefficient of friction between the vehicle wheels and the particular road upon which the vehicle is traveling. Anti-skid systems have been developed for automatically varying the braking pressure in accordance with these factors.

Many anti-skid systems include three basic components: a wheel speed sensor component for detecting the speed of a decelerating wheel, a logic component for receiving wheel speed data from the sensor and comparing it to an optimum wheel deceleration rate, and a brake pressure regulating valve component for reducing the braking pressure applied to the wheel brake upon receipt of an electrical signal from the logic component signifying that the wheel is experiencing a skid or an impending skid situation. The brake pressure regulating valve is also adapted to reapply braking pressure to the brake upon removal of the electrical signal by the logic component.

The effectiveness of the anti-skid system is dependent largely upon the responsiveness and other capabilities of the pressure regulating valve employed therewith. Several types of brake pressure regulating valves have been developed for use in anti-skid system. Many of these valves are made operative to regulate braking pressure by the use of solenoid assemblies. Solenoid assemblies are generally operative to move only between "on" and "off" positions. Thus many anti-skid valves are limited in the anti-skid mode of operation to an intermittent opening and closing of the brake line.

For example, a solenoid in such an anti-skid valve receiving a signal from the anti-skid logic component that a skid situation at the wheel is impending can cause the valve to block additional brake fluid and can release braking pressure at the brakes. When the impending skid situation is eliminated, the solenoid assembly allows the valve to reapply braking pressure.

Because an immediate and full reapplication of braking pressure occurs and because time is of the essence, the above-described solenoid actuated valves may tend to overshoot the optimum braking pressure. This can immediately cause a second impending skid situation and subsequent removal of braking pressure. Several rapid applications, exhausts, and reapplications of braking pressure can result before the valve produces the optimum braking pressure. This "hunting" by the valve for the optimum braking pressure can be extremely inefficient as to the distance and time required to stop a vehicle because the deceleration rate of the wheel must be permitted to increase after each skid or impending skid. The lost braking time in compensating for each skid situation can be critical, especially in emergency situations.

Anti-skid valves having double solenoid assemblies have been utilized to produce a multiple increment reduction and reapplication of braking pressure. Valves of this type can limit the amount of braking pressure applied or exhausted to smaller amounts. After a wheel skid, overshooting of the optimum braking pressure is not as severe because pressure can be reapplied in smaller increments until a maximum is attained. A rapid series of pressurizations and exhausting of brake fluid, however, is still the normal operating procedure. Further, the cost of the additional components of the valve to create this effect can be a disadvantage and may not be worth the increased efficiency attained.

SUMMARY OF THE INVENTION

This invention is directed to a skid control valve for regulating the braking pressure applied to a brake of a wheeled vehicle. The valve has a braking fluid inlet adapted for communication with a source of pressurized braking fluid and a braking fluid outlet adapted for communication with a fluid actuated brake of a wheel. A fluid passageway through the valve connects the inlet and outlet. During a braking of the vehicle, a first piston assembly is adapted to close the fluid passageway upon the occurrence of a wheel skid or an impending wheel skid situation. After elimination of the skid or skid situation and upon the opening of the passageway by the first piston assembly, a second piston assembly is adapted to partially restrict passage of braking fluid through the fluid passageway.

DETAILED DESCRIPTION OF A PREFERRED EMBODIMENT

Figure 1:
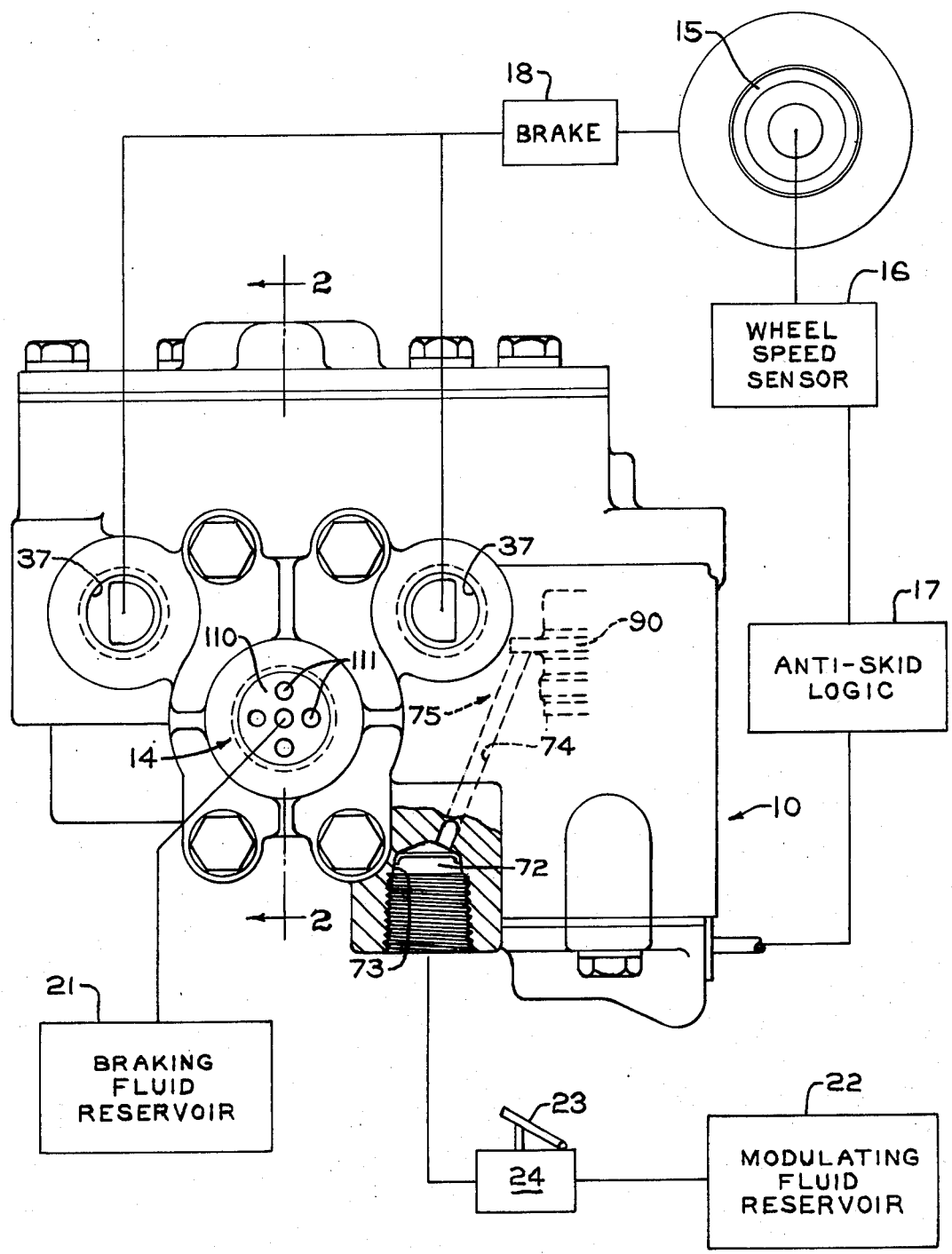
FIG. 1 is a schematic illustration of an anti-skid system utilizing the skid control valve of the present invention.

FIG. 1 schematically illustrates one type of anti-skid braking system in which the valve of the present invention can be utilized. This preferred system is an air actuated braking system suitable for use on vehicles such as trucks, tractors, trailers, buses, etc. Of course, this particular system can be adapted to utilize other types of braking fluids and can be adapted for use on other types of vehicles.

As illustrated in FIG. 1, the vehicle includes a wheel 15 and a conventional wheel brake 18 which may be a drum type brake. The system includes a braking fluid reservoir 21 and a modulating fluid reservoir 22. The braking fluid reservoir 21 is in open communication with a skid control valve 10. A conventional treadle valve 24 controls the passage of modulating fluid from the modulating fluid reservoir 22 to the skid control valve 10. The treadle valve 24 is actuated by a vehicle operator controlled treadle 23, with the modulating fluid passing through the valve 24 being proportional to the amount of treadle deflection. The treadle valve 24 is also operative to exhaust the modulating fluid in the valve 10 when the treadle 23 is released. The braking fluid cannot pass through the skid control valve 10 to the brake 18 until sufficient modulated fluid pressure is built up in the valve 10 as will hereinafter be described.

The anti-skid system further includes a wheel speed sensor component 16 which determines the rotational speed of the wheel. One type of sensor presently preferred is an electromagnetic sensor which generates an electrical signal proportional to the rotational speed of the wheel. An anti-skid logic component 17 is adapted to receive this signal and to detect a wheel lock or an impending wheel lock. Upon detection by the logic component of such a situation, a signal will be sent to the anti-skid valve 10 to reduce the braking pressure being applied to the brake 18.

Figure 2:
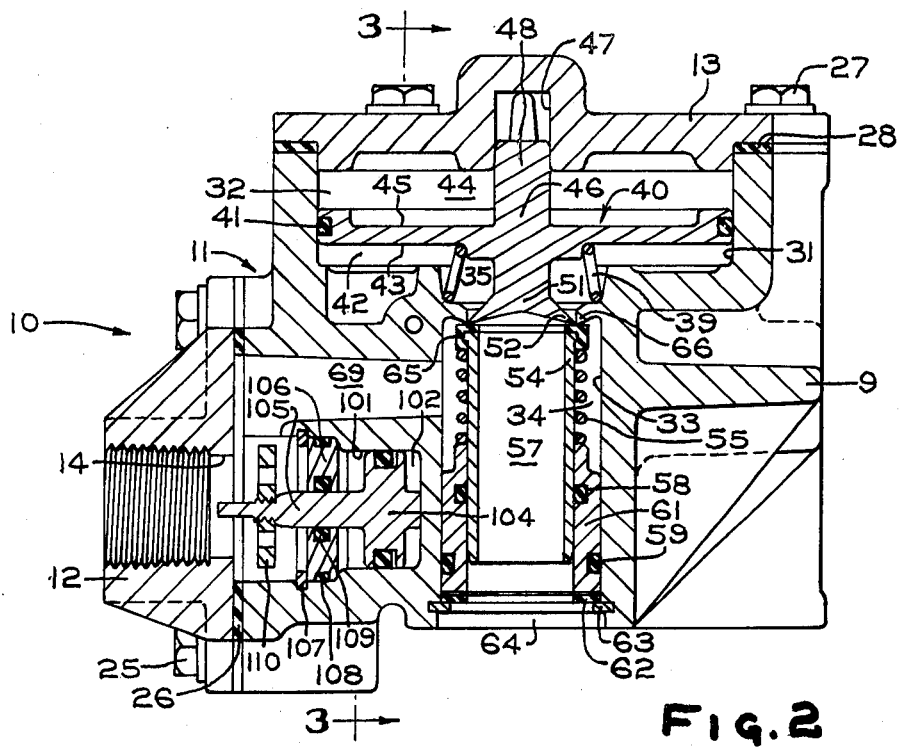
FIG. 2 is a sectional view of the skid control valve of the present invention taken through line 2—2 of FIG. 1.

Referring to FIG. 2, the anti-skid valve 10 has a valve housing 11 which includes a main housing component 9, a side cover 12 and a top cover 13. The side cover 12 is mounted to the main housing component 9 by bolts 25. An airtight seal between the main housing component 9 and the side cover is provided by an elastomeric seal 26. The top cover 13 is similarly mounted to the main housing component 9 by bolts 27, with an airtight seal provided by an elastomeric seal 28.

Valve housing 11 includes a cylindrical bore 31 defining a balancing piston chamber 32. Coaxial with bore 31 is another cylindrical bore 33 which defines an exhaust chamber 34. A third coaxial cylindrical bore 35 forms an aperture between the bores 31 and 33.

A cylindrical bore 14 in side cover 12 provides an inlet opening in the valve housing 11. Means (not shown) are provided for fluid communication between the braking fluid reservoir 21 and the inlet opening 14. Bores 37 in the housing 11 are in communication with a portion of the balancing piston chamber 32 and provide outlet openings 38 which lead to the vehicle brake 18 (See also FIGS. 1 and 3). Additional outlets (not shown) such as 38 may also be provided in the housing 11 in communication with portions of the balancing piston chamber 32. A braking fluid passageway 69 extends through the valve housing 11 from the inlet opening 14 through the bores 33, 35 and 31 to the outlet openings 38.

Within the balancing piston chamber 32 and movable in a direction parallel to the axis of the bore 31 is a cylindrical balancing piston 40. The diameter of the piston 40 is about the same as the diameter of the bore 31. An elastomeric seal 41 provides an airtight seal between the piston 40 and the bore 31. The balancing piston 40 divides the balancing piston chamber into a braking fluid chamber 42 and a modulating fluid chamber 44. The balancing piston 40 has a surface 43 forming a boundary of the braking fluid chamber 42 and adapted for exposure to braking fluid within chamber 42, and an opposing surface 45 forming a boundary of the modulating fluid chamber 44 and adapted for exposure to modulating fluid within chamber 44.

The piston 40 has a generally axially extending member 46 through its center. The upper portion (as seen in FIG. 2) of the member 46 forms a guide stem 48 which extends into a bore 47 in the top cover 13 for axially aligning the piston 40 during axial movement within the bore 31. The lower portion 51 of the member 46 has an annular flange 52 for providing a seal between the member 46 and an exhaust tube 54.

Exhaust tube 54 is axially movable within an exhaust chamber 34 formed by bore 33. The tube 54 has a generally cylindrical shape with a passageway 57 extending therethrough. The passageway 57 is a conduit for braking fluid from the braking fluid chamber 42 to the atmosphere. The wall thickness of the exhaust tube 54 is about 15% to 20% of the diameter of the tube for maximum exhaust volume capacity. Tube 54 is guided during movement by a hollow cylindrical retainer 61. The retainer 61 is supported within the bore 33 by a retainer ring 63 and by an exhaust seal 62. Elastomeric O-rings 58 and 59 provide for an airtight seal between the exhaust tube 54 and the retainer 61, and the retainer 61 and the main housing component 9, respectively.

In the upper portion, as seen in FIG. 2, the exhaust tube 54 receives an annular elastomeric seal 65. The seal 65 is adapted for contact with the annular flange 52 of the balancing piston 40, thereby sealing off the exhaust port 64. The seal 65 is further adapted for contact with an annular lip 66 of the bore 35, thereby sealing the passageway 69.

A tapered compression spring 55 rests upon a flange of the retainer 61 and biases the exhaust tube 54 upward as viewed in FIG. 2 to a sealing position with lip 66. A second tapered compression spring 39 rests upon a portion of the main housing component 9 and biases the balancing piston 40 upward. The force due to spring 55 will bias the exhaust piston 54 upward into a sealing relation with lip 66. The force due to spring 39 will bias the balancing piston 40 upward off of the seal 65, providing open communication between brake fluid chamber 42 and the exhaust port 64.

Referring again to FIG. 1, the valve housing 11 has a modulating fluid inlet 72 formed by a generally cylindrical bore 73. The inlet 72 is adapted for communication with the modulated fluid reservoir 22 as previously described. Another bore 74 in communication on one end with the inlet 7 and on its other end with a chamber 90 forms a portion of a modulating fluid passageway 75. The passageway 75 extends from the inlet 72 through a series of bores and chambers to the modulating fluid chamber 44.

Figure 3:
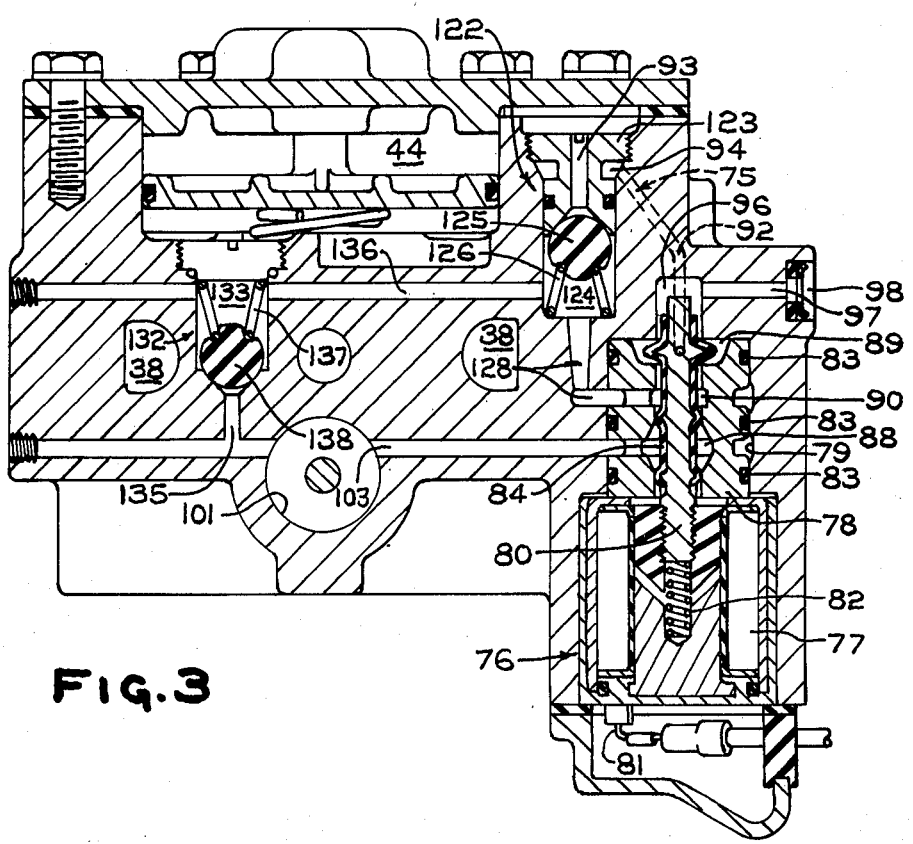
FIG. 3 is a sectional view of the skid control valve of the present invention taken through line 3—3 of FIG. 2.

As seen in FIG. 3, the housing 11 has a solenoid assembly 76, including a solenoid coil 77 adapted to receive electrical signals from the anti-skid logic 17 through electrical hookup 81. A plunger 80 extends partially into the solenoid assembly 76. A compression spring 82 biases the plunger 80 upward as viewed in FIG. 3 toward an open position. The solenoid assembly 76 is adapted to pull the plunger 80 downward into a closed position upon receipt of an electrical signal from the anti-skid logic component 17.

The plunger 80 also extends partially into a plunger housing 78. The plunger housing 78 is received in a bore 79 in the main housing component 9, with an airtight seal therewith provided by elastomeric O-ring seals 83. The plunger housing 78 includes a series of interconnected coaxial bores, one of which forms the chamber 90 in communication with the inlet 72. Bores on either side of bore 90 form chambers 88 and 89 respectfully. The plunger 80 extends into and is adapted for axial movements within each of these chambers 88, 89 and 90, and is thereby adapted to provide alternating communication between chamber 90 and chambers 88 and 89, as will hereinafter be described.

A portion of the plunger 80 which extends through the plunger housing 78 is coated with an elastomeric material 84 such as rubber to facilitate sealing with the apertures in the housing 78. The plunger 80 is pressure balanced such that its movement is not affected by fluid pressures acting on it. More specifically, every force applied to the plunger by means of pressurized fluid, such as the modulating fluid, acting on a particular area is counteracted by an equal force acting on the plunger in the opposite direction and caused by a fluid of equal pressure acting on an equal area of the plunger 80.

The pressure balanced plunger 80 can therefore be moved by the solenoid assembly 76 from an open position to a closed position, and vice versa, without having to overcome forces due to fluid pressure. This insures a more rapid response to the electrical current in the solenoid and therefore a more rapid compensation for a skid situation existing at a vehicle wheel.

Chamber 89 is in open communication with chamber 94 through bore 92 which forms another portion of modulated fluid passageway 75. Chamber 94 is in open communication with modulated fluid chamber 44 through passageway 93.

Main housing component 9 also contains a bore adjacent chamber 89 forming a modulating fluid exhaust chamber 96. The chamber 96 is in open communication with a modulating fluid exhaust port 98 through a bore 97. Exhaust chamber 96 is adapted for communication with chamber 89 upon a downward movement of the plunger 80.

Referring once again to FIG. 2, in the valve housing 11 opposite and coaxial with the inlet 14 is a cylindrical bore 101 forming a baffle piston chamber 102. A passageway 103 leads from the baffle piston chamber 102 to the chamber 88 in the solenoid housing 78. A generally cylindrical baffle piston 104 is axially movable within the bore 101. The baffle piston 104 has a generally axially extending guide member 105 which passes through a guide plate 106. The guide plate is retained adjacent the bore 101 by a retainer ring 107. An airtight seal between the guide plate 106 and the housing 11 is provided by an elastomeric seal 108, and between the guide plate 106 and the guide member 105 by an elastomeric O-ring 109.

A baffle 110 is rigidly attached to an end portion of the guide member 105. The baffle 110 is generally disc shaped with four drill holes 111 extending therethrough, as can more clearly be seen in FIG. 1. The centers of the holes 111 are equidistant from the center of the disc and are equally spaced from each other.

The baffle 110 is in an open position as seen in FIG. 2. The baffle is adapted to move axially toward the inlet 14 in response to a corresponding movement by the baffle piston 104 to another position partially closing the inlet 14. The radially outward periphery of the baffle 110 is adapted to contact the side cover 12 at portions surrounding the inlet opening 14 when the baffle piston 104 is moved to its extreme leftward position as viewed in FIG. 2.

The anti-skid valve 10 further includes two modulating fluid exhaust check valve assemblies 122 and 132. Check valve assembly 122 includes a housing 123 having a passageway 93 in communication at one end with the modulating fluid chamber 44 and on the other end with an exhaust chamber 124. Chamber 124 is in open communication with chamber 90 by means of passageways 128.

An elastomeric valve member 125 is biased by a tapered compression spring 126 to seal an end of the passageway 93. Modulating fluid within chamber 124 also acts to bias the valve member 125 into a position sealing passage 93.

Passageway 103 is adapted to be in communication with chamber 90 through bores 135, 136 and 128. A check valve assembly 132 is located in chamber 133 which joins bores 135 and 136 and is adapted to block an end of bore 135. Valve assembly 132 includes an elastomeric valve member 138 and a compression spring 137 which biases the member 138 toward an end of the bore 135. Modulating fluid within chamber 137 also acts to bias the valve member 138 toward a closed position.

For a more thorough appreciation of the invention, an illustration of its operation is presented. A moving vehicle such as a truck having a rotating wheel 15 is adapted to provide a constant fluid pressure of about 100 psi in both the braking fluid reservoir 21 and the modulating fluid reservoir 22. Prior to operation of the brake system, the braking fluid reservoir is in open communication with the inlet 14 of the anti-skid valve 10, thereby allowing a pressurized braking fluid to be within the braking fluid passageway 69. Spring 55 forces the exhaust tube 54 upward as viewed in FIG. 2 into a sealing relationship with annular flange 66, thereby closing passageway 69. Spring 39 forces balancing piston 40 to an upward position as viewed in FIG. 2.

Also prior to operation of the braking system, the modulating fluid will be contained in the modulating fluid reservoir 22 by the closed treadle valve 24. The solenoid plunger 80 will be positioned outwardly (upward in FIG. 3) of the solenoid assembly 76 as is shown in FIG. 3, thereby sealing chamber 89 from exhaust chamber 96 and chamber 90 from chamber 88.

When the vehicle operator desires to stop the vehicle, he depresses the treadle 23, thereby opening treadle valve 24 and allowing pressurized modulating fluid to escape the reservoir 22. The modulating fluid thereby enters the anti-skid valve, passing through modulating fluid passageway 75. The modulating fluid travels through bore 74 to chambers 90 and 89, and through bore 92 to chamber 94 and ultimately to the modulating fluid chamber 44. Prior to an impending skid condition at wheel 15, the anti-skid valve 10 operates as a relay valve wherein the braking fluid pressure applied to the brake 18 is proportional to the pressure applied to the treadle 23 by the vehicle operator.

As the vehicle operator opens treadle valve 24, modulating pressure builds in the modulating fluid chamber 44. The pressurized modulating fluid acts against the surface 45 of the balancing piston 40 biasing it downward against the seal 65 of exhaust tube 54. As the balancing piston 40 moves tube 54 downward, the sealing relation between the exhaust tube seal 65 and the orifice sealing lip 66 is broken, creating an annular orifice from braking fluid passageway 69 to the braking fluid chamber 42. Pressurized braking fluid is then free to travel through the orifice to chamber 42, through brake ports 38 and ultimately to the brake 18.

The treadle valve 24 controls the pressure of the modulating fluid in the chamber 44 which must counteract the force applied to the piston 40 by the braking fluid in chamber 42 to maintain the annular opening between passageway 69 and chamber 42. As the vehicle operator applies more pressure to the treadle 23, the annular opening will increase thereby applying more braking pressure to the brake 18. When the operator releases the treadle 23, the modulating fluid retraces its path through passageway 75 and back to the treadle valve 24 where it is exhausted to the atmosphere. Being unbalanced, the piston 40 will move to an upward position allowing the braking fluid in chamber 42 to escape through passageway 57 of the exhaust tube 54, thereby releasing pressure at the brake 18.

When an emergency stop is required, the vehicle operator applies a maximum pressure to the treadle 23, fully opening the treadle valve 24. Modulating fluid in chamber 44 reaches its maximum pressure, i.e. that of the modulating fluid in the reservoir 22. The balancing piston 40 thereby engages the exhaust tube 54 with piston 40 and tube 54 moving to their extreme downward or "open" position. Braking fluid is then free to pass through passageway 69 to the brake 18 at a maximum rate, as is desirable in an emergency.

Any wheel lock or a potential wheel lock situation at wheel 15 will be indicated to the anti-skid logic component 17 by the speed sensor component 16. A corresponding electrical signal will be sent from the logic component to the solenoid assembly 76 of the anti-skid valve 10. The electrical current passing through the solenoid coil 77 will pull the plunger 80 into the solenoid assembly 76 (downwardly in FIG. 3), thereby sealing chamber 90 from 89 and opening communication between chambers 89 and 96 and between chambers 90 and 88.

The change of position of the plunger will have two effects on the operation of the valve 10. Firstly, modulating fluid passing into chamber 90 will travel into chamber 88 and through bore 103 to the baffle piston chamber 102. The pressure on baffle piston 104 will force it leftwardly in FIG. 2 to a position wherein the baffle 110 partially blocks the braking fluid inlet 14. The baffle will be held in this position until the vehicle operator releases the treadle 23 as will become apparent.

Secondly, the pressurized modulating fluid in chamber 44 will be in open communication with the atmosphere through exhaust port 98. The modulating fluid will travel from chamber 44 retracing its path through chamber 94 and bore 92 to chamber 89. From chamber 89, the pressurized fluid escapes the valve through chamber 96 and bore 97 to exhaust port 98. As the modulating fluid acting on surface 45 of balancing piston 40 decreases in pressure, the piston 40 will move upwardly, allowing the exhaust tube 54 to move upwardly, sealing the braking fluid passageway 69. Ultimately, the piston 40 will unseat itself from the exhaust tube 54, creating an annular orifice from braking fluid chamber 42 to exhaust passageway 57. The braking fluid at brake 18 can thereby exhaust itself through port 64 to atmosphere.

The locked wheel 15 will gain rotational speed as the braking forces are released, with the speed sensor 16 communicating the change to the anti-skid logic 17. When the logic component determines that the skid or impending skid situation has been eliminated, the electrical signal to the solenoid assembly 76 will cease, resulting in the spring 82 forcing the plunger 80 upward to its initial open position.

During the above described process, modulating fluid within valve chamber 133 is not in communication with an exhaust port and thus remains pressurized. When the plunger 80 returns to its initial open position, the modulating fluid in baffle piston chamber 102 cannot be released through passageway 135 because the modulating fluid pressure in chamber 133 will hold the valve member 138 in a closed position.

The braking process will begin to repeat itself with the balancing piston 40 reopening the braking fluid passageway 69. However, a repetition of the rapid rate of flow of braking fluid to the brake 18 will not occur. Braking fluid passing through the inlet 14 will be restricted by baffle 110. This more deliberate reapplication of the brake is highly desirable because a second wheel skid or skid situation is much more likely to occur after a first skid or skid situation. However, it would not be desirable to permanently restrict the inlet 14 because a rapid application of the brake is required for the initial braking and during other nonskid conditions. The valve of the present invention, therefore, has the desired characteristics of responsiveness in nonskid situations and controlled brake reapplication in skid situations.

The vehicle operator will release the treadle 23 when the vehicle has stopped. The treadle valve 24 will seal the modulating fluid reservoir 22 from the valve 10 and will provide an exhaust to atmosphere for the pressurized modulating fluid. When the modulating fluid within bores 128 and 136 and chambers 124 and 133 is released, the elastomeric valve member 138 will be biased upward by modulating fluid within bore 135. Thus, an escape passageway for pressurized modulating fluid within baffle piston chamber 102, chamber 88 and bores 103 and 135 is provided to chamber 90 and thus to the atmosphere through treadle valve 24.

The baffle 110 will remain in a position partially blocking the inlet opening 14 after the pressure has been removed in baffle piston chamber 102. However, the initial force supplied by the braking fluid as it passes through the inlet 14 upon the next application of the brakes will force the baffle 110 rightwardly in FIG. 2 to an open position whereby the braking fluid passageway 69 is generally unrestricted by the baffle.

Valve 122 provides an additional safety feature to the anti-skid valve 10. In a typical prior art valve, in the event that a blocking occurs in a modulated fluid passageway between the modulating chamber and the modulating fluid exhaust port, as for example due to dirt or particles in the modulating fluid, the valve in effect may not be able to respond to a skid condition. Valve 122, however, provides a secondary escape path. If the passageway is blocked between the chamber 44 and chamber 89, a release of pressure in chamber 124 remains possible through bores 128 and chamber 90 to chamber 89. The pressure in bore 93 can thereby bias the valve member 125 downward in FIG. 3, allowing fluid in chamber 44 to escape.

Although the foregoing structure has been described for the purpose of illustrating a presently preferred embodiment of the invention, it should be understood that many modifications or alterations may be made without departing from the spirit and the scope of the invention as set forth in the appended claims.

I claim:

1. In an anti-skid system for use in controlling the braking pressure applied to a braking means of a wheel, said system including means for detecting a skid situation or an impending skid situation at said wheel and producing an electrical signal in response thereto and a control valve for regulating the amount of said braking pressure applied to said wheel, wherein said control valve comprises:

a valve housng having a balancing piston chamber, a baffle piston chamber, an inlet opening for braking fluid, said braking fluid inlet opening adjacent said baffle piston chamber, and an inlet opening for modulating fluid;

a balancing piston movable within said balancing piston chamber and having two opposing surfaces, each of said surfaces adaped to be exposed to a pressurized fluid which biases said balancing piston, and a baffle piston movable within said baffle piston chamber and adapted to be exposed to a pressurized fluid within said baffle piston chamber which biases said baffle piston;

a braking fluid chamber having a boundary which comprises one of said opposing surfaces of said balancing piston, a braking fluid passageway from said braking fluid inlet opening to said braking fluid chamber, and a braking fluid communication means between said braking fluid chamber and said braking means;

a modulating fluid chamber having a boundary which comprises the other of said opposing surfaces of said balancing piston, a first modulating fluid passageway between said modulating fluid chamber and said modulating fluid inlet opening, and a second modulating fluid passageway between said first modulating fluid passageway and said baffle piston chamber;

a solenoid valve assembly operative in response to said electrical signal to divert said modulating fluid from said first modulating fluid passageway through said second modulating fluid passageway to said baffle piston chamber, and a baffle movable in response to said movement of said baffle piston, said baffle adapted to partially block said braking fluid inlet opening thereby partially restricting the flow of said braking fluid through said braking fluid passageway.

2. A control valve as defined in claim 1 further comprising a third modulating fluid passageway from said modulated fluid chamber to said first passageway, said third passageway having a safety check valve assembly adapted to open said third passageway in the event of a blockage of said first passageway.

3. A control valve as defined in claim 1 wherein said solenoid valve assembly comprises a solenoid plunger operative to move from a first position allowing fluid communication between said modulating fluid chamber and said modulating fluid inlet opening and a second position adapted to achieve said diversion of said modulating fluid from said first modulating fluid passageway to said second modulating fluid passageway, wherein said solenoid plunger is pressure balanced, whereby movement of said plunger from one of said positions to the other of said positions is unaffected by fluid pressure within said valve.

4. A skid control valve comprising:
 a valve housing having a balancing piston chamber and a balancing piston movable within said balancing piston chamber, said balancing piston having two opposing surfaces, each of said surfaces adapted to be exposed to a pressurized fluid which biases said balancing piston;

a relay system having an inlet in said housing for braking fluid, a braking fluid chamber having a boundary which comprises one of said opposing surfaces of said balancing piston, and braking fluid communication means between said braking fluid inlet and said braking fluid chamber;

a modulating system having an inlet in said housing for modulating fluid, a modulating fluid chamber having a boundary which comprises the other of said opposing surfaces of said balancing piston, and a first modulating fluid communication means between said modulating fluid inlet and said modulating fluid chamber;

a baffle system having a baffle piston chamber in said housing, a second modulating fluid communication means between said first modulating fluid communication means and said baffle piston chamber, a baffle piston movable within said baffle piston chamber in response to fluid pressure within said baffle piston chamber, and a baffle movable in response to said movement of said baffle piston and adapted to partially block passage of said braking fluid through said braking fluid communication means, and a solenoid valve assembly operatively associated with said first and said second modulating fluid communication means to divert said modulating fluid from said first modulating fluid communication means to said second modulating fluid communication means.

* * * * *